Patented May 17, 1927.

1,629,072

UNITED STATES PATENT OFFICE.

RALPH R. DANIELSON, OF CHICAGO, ILLINOIS.

COMPOSITION FOR AND METHOD OF COATING METAL SURFACES.

No Drawing. Application filed December 1, 1923. Serial No. 678,043.

(GRANTED UNDER THE ACT OF MARCH 3, 1883; 22 STAT. L. 625.)

The invention described herein may be used by the Government, or any of its officers or employees in prosecution of work for the government, or by any other person in the United States, without payment to me of any royalty thereon, in accordance with the act of March 3, 1883.

The subject of this invention is a composition for and method of coating metal surfaces for selective carburization.

Selective carburization is well known and has been most commonly carried out by coating those portions of the surfaces not to be carburized with a material impervious to carburizing gases, such as fire clay or copper.

Fire clay coatings have proved somewhat unsatisfactory as the clay has a tendency to lose contact with the metal surface or to flake off and when the clay mixtures are changed to avoid these defects the coating is rendered porous and does not properly exclude the gases.

Copper plating is satisfactory when properly applied but the plating process requires very clean surfaces and close control of the plating operation. Moreover it is expensive and time consuming.

The coating forming the subject of this invention is readily and inexpensively applied and sufficiently dense and coherent to prevent or retard penetration by carburizing gases.

The coating is further readily chipped off when dry and so may be removed in part before carburizing, if desired, thus exposing portions of the surface.

Due to the great difference in the rate of contraction on cooling, between the metal and the coating, the latter readily cracks off during cooling (after the carburizing process). Any of the material adhering after the carburizing process has been completed may very readily be removed.

The coating is of the enamel type and is more effective than fire clay in preventing carburization and less expensive than copper plate. It is easily prepared and readily applied to the metal surfaces by dipping, brushing, spraying, etc.

The coating forming the subject of this invention is composed of a silicate product such as flint or quartz, a sodium salt, for instance sodium nitrate or sodium carbonate, borax, white lead or a lead oxide, such as red lead, a white or buff burning clay of desirable plasticity and a suitable liquid, preferably water.

A coating prepared in accordance with my invention will now be described by way of illustration:

| | Parts. |
|---|---|
| Flint ($SiO_2$) | 69.90 |
| Borax | 36.96 |
| $NaNO_3$ | 6.95 |
| $Pb_3O_4$ | 8.17 |

This mixture is known as "frit". To 100 parts of frit is added 93 parts of clay producing what is known as mill mix.

The mixture known as frit may be sintered at 850° C. to 900° C. the resulting mass is preferably powdered and sieved. To this is added clay, a suitable form of clay for this purpose is J and P clay (which is a special enamel clay obtained from Johnson and Porter of MacKenzie, Tenn., known as "No. 11 clay"), in the proportion of 100 parts of frit to 93 parts of clay. Water is added to the mill mix to give a coating whose consistency is that of ordinary enamel or a little more viscous than enamel. Excess water will do no harm as the water in excess rises to the top of the coating material (after setting) and may be poured off, if so desired.

Preparation of the surface for application is as follows:

In order to apply the material it is necessary to have a clean surface, free from grease, oils, and scale, as the brittle nature of the coating after drying causes it to crack if the prescribed surface is not obtained. The procedure followed, although, in general the same, may vary somewhat according to the circumstances, i. e. 1 for smooth clean surfaces; 2 for coarse and oxidized surfaces.

The procedure will be given for the two types of surfaces in the order above named.

1. Smooth clean surfaces: Pickle in a 10% solution of nitric, sulfuric, or hydrochloric acid or similar pickling solution until the surface appears slightly chipped or roughened and then wash in water, dip in caustic solution or alcohol, rinse in water and dry.

2. For coarse and oxidized surfaces: Pickle the metal in a solution of HCl or H$_2$SO$_4$ etc., of about 10% concentration until the oxide is loosened and the surface appears clean. (Note: certain particles of oxide or rolled metal may adhere very tenaciously and will not be removed by pickling. These particles, judging from experience with rolled plates, do not interfere with the application of the coating. The metal is then dried and further cleaned with emery paper, sand or shot blast, wire brushes, etc., to remove any remaining oxide.) After freeing the surface of loosened material, it is washed in water and dipped in alcohol or caustic solutions to neutralize the effect of the acid, rewashed in water and dried. This procedure may be repeated if the surfaces so require, until they are free of scale or oxide films.

Application of coating.

The coating may be applied in a number of ways. Two methods of applications have been used and both appear to be satisfactory.

One method of applying the coating is by a process of dipping. This has been used only on small specimens, due to the fact that it is most convenient for this size but it may be used for large size pieces as well if it is desired to have the entire surface which is submersed protected against penetration by the carburizing gases. This method can also be applied to large pieces of metal of which only portions of submersed surfaces are to be carburized. In this case the portions requiring exposure to the carburizing gases, may be wiped clean with a cloth. (This wiping procedure may also be applied to smaller pieces.) In general the second method to be described is more desirable for large pieces of metal, both from a standpoint of economy of coating and convenience of application.

After the first coat has been dried, a second, third and as many coats as desired may be applied in the same manner allowing each coat to dry before putting the following one on.

Three coats have been found to be convenient for a forty-eight hour exposure by this method or more or less may suffice; a coating thickness varies with the time of carburizing and the degree of protection desired.

Care should be exercised to avoid air bubbles in the coating by redipping immediately if these are in evidence. In the second method the coating is applied by brushing it on. This method is especially useful for metal objects whose surfaces are not smooth and in general may be found to be more satisfactory than the dipping process for all large pieces irrespective of the conditions of their surfaces.

The first coat applied should be a thin covering or priming coat, care being taken to brush the coating well into any crevices which may be present. This thin coating insures the adherence of subsequent coats.

The coats subsequently applied should be heavier than the first, filling the brush well and then drawing lightly over the surface, enough to cause the material to draw off the brush on to the metal.

The coat after covering the surfaces may be lightly gone over to even it, care being taken to have the brush well filled with the coating while so doing so as to avoid breaking the surface of the covering. Although these two coats may suffice, it may be well to apply one or two more heavier coats in the same manner as a matter of safety.

I claim:

1. A composition for use in protecting metallic surfaces in selective carburization comprising, 100 parts of frit, prepared by sintering at 800° C. to 900° C., a mixture of 64.90 parts of flint, 36.96 parts of borax, 6.95 parts NaNO$_3$ and 8.17 parts Pb$_3$O$_4$, powdering the resulting mass and sifting the powder; mixed with 93 parts of enamel clay, and sufficient water to bring the mixture to the consistency of an ordinary enameling composition.

2. A composition for use in protecting metallic surfaces in selective carburization comprising, a sintered mixture of flint, borax, NaNO$_3$ and Pb$_3$O$_4$, powdered and sifted, mixed with enamel clay and sufficient water to bring the material to a proper coating consistency.

3. A composition for use in protecting metallic surfaces in selective carburization, comprising, a sintered mixture of flint, borax, NaNO$_3$ and Pb$_3$O$_4$, mixed with enamel clay and sufficient water to bring the material to a proper coating consistency.

4. A composition for use in protecting metallic surfaces in selective carburization comprising flint, borax, NaNO$_3$ and Pb$_3$O$_4$, enamel clay and sufficient liquid to bring the material to a proper coating consistency.

5. A composition for use in protecting metallic surfaces in selective carburization comprising, a sintered mixture of 64.90 parts of a silicate product, 36.96 parts of borax, 6.95 parts of a sodium salt, 8.17 parts of lead oxide powdered and sifted and mixed with enamel clay in the proportion of 100 parts of sieved material to 93 parts of clay to which has been added a liquid to bring the mixture to the consistency of an ordinary enameling composition.

6. A composition for use in protecting metallic surfaces in selective carburization comprising, a sintered, powdered and sifted mixture of a silicate product, borax, sodium salt and lead oxide to which have been added enamel clay and sufficient liquid to bring the material to a proper coating consistency.

7. A composition for use in protecting metallic surfaces in selective carburization comprising, a sintered mixture of a silicate product, borax, sodium salt, and lead oxide, to which has been added enamel clay and sufficient liquid to bring the material to a proper coating consistency.

8. A composition for use in protecting metallic surfaces in selective carburization comprising, a silicate product, borax, sodium salt, lead oxide, enamel clay and sufficient liquid to bring the material to a proper coating consistency.

9. A composition for use in protecting metallic surfaces in selective carburization comprising 100 parts of glass base, 93 parts of enamel clay and water.

10. A composition for use in protecting metallic surfaces in selective carburization comprising substantially equal parts of glass base and enamel clay.

RALPH R. DANIELSON.